United States Patent
Baer

(10) Patent No.: US 11,106,731 B2
(45) Date of Patent: Aug. 31, 2021

(54) METHODS AND APPARATUSES FOR DETERMINING META DATA RELATED TO MEDIA CONTENT

(71) Applicant: Telia Company AB, Solna (SE)

(72) Inventor: Anders Baer, Årsta (SE)

(73) Assignee: Telia Company AB

( * ) Notice: Subject to any disclaimer, the term of this patent is extended or adjusted under 35 U.S.C. 154(b) by 215 days.

(21) Appl. No.: 16/220,673

(22) Filed: Dec. 14, 2018

(65) Prior Publication Data
US 2019/0197054 A1 Jun. 27, 2019

(30) Foreign Application Priority Data
Dec. 21, 2017 (SE) .................................. 1751616-2

(51) Int. Cl.
G06F 16/683 (2019.01)
G06F 16/68 (2019.01)
G06F 16/687 (2019.01)

(52) U.S. Cl.
CPC ............ G06F 16/685 (2019.01); G06F 16/68 (2019.01); G06F 16/686 (2019.01); G06F 16/687 (2019.01)

(58) Field of Classification Search
CPC ...... G06F 16/685; G06F 16/68; G06F 16/687; G06F 16/686; G06F 16/63; G06F 16/60; H04W 4/02
See application file for complete search history.

(56) References Cited

U.S. PATENT DOCUMENTS

| 9,224,385 B1 | 12/2015 | Sharifi et al. |
| 2003/0083961 A1* | 5/2003 | Bezos ................ G06Q 30/0633 705/26.8 |
| 2004/0128320 A1* | 7/2004 | Grove .................... G06Q 30/06 |
| 2006/0195480 A1* | 8/2006 | Spiegelman ........... G06Q 30/02 |
| 2006/0277213 A1* | 12/2006 | Robertson ........... H04L 63/0263 |

(Continued)

FOREIGN PATENT DOCUMENTS

| EP | 1307833 A0 | 7/2006 |
| EP | 2541438 A1 | 1/2013 |

(Continued)

OTHER PUBLICATIONS

Extended European Search Report, App. No. 18210086.7-1217, dated Feb. 25, 2019, pp. 1-9, European Patent Office, Munich, Germany.

(Continued)

*Primary Examiner* — Cam Y T Truong
(74) *Attorney, Agent, or Firm* — Burr & Forman LLP; Jeffrey H. Kamenetsky

(57) ABSTRACT

The embodiments herein relate to method and a UE for determining meta data information associated with a media content, the method comprising: capturing a fragment of the media content; sending a request to a network node for performing an acoustic/audio fingerprinting on said fragment; receiving a result of the identification from the network node; collecting or recording meta data for linking to the identified media content; and storing at least the collected or recorded meta data and the result of the identification locally in the UE or in a database accessible to a network node. The embodiments also relate to a method in a network node and a network node.

10 Claims, 9 Drawing Sheets

(56) References Cited

U.S. PATENT DOCUMENTS

| | | | | |
|---|---|---|---|---|
| 2009/0172538 A1* | 7/2009 | Bates | ................... | G06F 16/639 |
| | | | | 715/706 |
| 2012/0109997 A1* | 5/2012 | Sparks | ................. | G06F 16/435 |
| | | | | 707/769 |
| 2012/0215332 A1* | 8/2012 | Gutstadt | ............. | G06F 16/9535 |
| | | | | 700/94 |
| 2014/0195028 A1* | 7/2014 | Emerson, III | ........ | G10L 19/018 |
| | | | | 700/94 |
| 2016/0088031 A1 | 3/2016 | Kumar et al. | | |

FOREIGN PATENT DOCUMENTS

| | | |
|---|---|---|
| WO | 2011008571 A1 | 1/2011 |
| WO | 2016032985 A1 | 3/2016 |

OTHER PUBLICATIONS

Swedish Search Report, App. No. 1751616-2, Aug. 31, 2018, pp. 1-3, Swedish Patent and Registration Office, Stockholm, Sweden, Anders Jarnberg.

\* cited by examiner

METHODS AND APPARATUSES FOR DETERMINING META DATA RELATED TO MEDIA CONTENT

TECHNICAL FIELD

The present disclosure relates to the field of data communications, and in particular to determining meta data associated with media content and to retrieving said meta data together with identified media content when the same media content is subsequently consumed by a user.

BACKGROUND

Developments in Internet technology provide a wide range of consumer applications where it is useful for a device or application to automatically identify what media content a consumer is listening to or is watching. Audio or acoustic fingerprinting is used to identify media content based on its audio signal. Fingerprints are extracted from a fragment or a sample of the media content, and then used to search a fingerprint database of known content. As an example, a remote server receives, form a portable communication device, the transmitted audio track profile and compares the profile to a stored database of audio tracks. If a matching audio track is identified by the remote server, data relating to the identified audio track are transmitted from the remote server to the communication device. The received audio track data is then displayed on the portable device. The audio track data may be stored locally in the device enabling the user to locally retrieve the track data the next time the same audio track is played. The content of the data relating to the media content is however static and cannot be influenced by the user.

SUMMARY

It is an object of embodiments herein to solve the above problem by providing methods, apparatuses and computer program products for enhancing user experience by determining additional meta data information that are initially not linked to the media content and associate or link those with the media content.

According to an aspect of embodiments herein, there is provided a method performed in a user equipment (UE) for determining meta data information associated with a media content, the method comprising: capturing a fragment of the media content; sending a request to a network node for performing an acoustic/audio fingerprinting on said fragment to identify the media content that corresponds to the captured fragment; receiving a result of the identification from the network node; collecting or recording meta data for linking to the identified media content, which meta data includes at least one of the following data collected or recorded during the time said media content is being consumed by the user of the UE: time/date of the identified media content; photos(s) and/or video(s); a location of a user of the UE, biological data of the user; and storing at least the collected or recorded meta data and the result of the identification locally in the UE or in a database accessible to a network node.

According to another aspect of embodiments herein, there is provided a method performed in a network node (e.g. a server of a service provider) for storing meta data information associated with a media content, the method comprising: receiving a request from a UE for performing an acoustic/audio fingerprinting on a fragment of the media content captured by the UE, in order to identify the media content that corresponds to the fragment. The method further comprises, transmitting a result of the identification to the UE; receiving, from the UE, meta data collected or recorded by the UE, which meta data includes at least one of the following data collected or recorded during the time said media content is being consumed by the user of the UE: time/date of the identified media content; photos and/or videos; a location of the user of the UE, biological data of the user.

According to another aspect of embodiments herein, there is provided a UE for determining meta data information associated with a media content. The UE comprises a processor and a memory containing instructions executable by the processor, wherein the UE is operative to: capture a fragment of the media content; send a request to a network node for performing an acoustic/audio fingerprinting on said fragment to identify the media content that corresponds to the captured fragment; receive a result of the identification from the network node; collect or record meta data for linking to the identified media content, which meta data includes at least one of the following data collected or recorded during the time said media content is being consumed by the user of the UE: time/date of the identified media content, photo(s) and/or video(s), a location of the user of the UE and biological data of the user. The UE is further operative to store at least the collected or recorded meta data and the result of the identification locally in the UE or in a database accessible to the network node.

According to another aspect of embodiments herein, there is provided a network node for storing meta data information associated with a media content, the network node comprising a processor and a memory containing instructions executable by the processor, wherein the network is operative to: receive a request, from a UE, to perform an acoustic/audio fingerprinting on a fragment of the media content captured by the UE; to identify the media content; transmit a result of the identification to the UE; receive, from the UE, meta data collected or recorded by the UE, which meta data being collected or recorded by the UE during the time said media content is being consumed by a user of the UE. The meta data includes at least one of the following data: time/date of the identified media content; photo(s) and/or video(s); a location of the user, biological data of the user. The network node is further operative to store at least the collected or recorded meta data and the result of the identification locally in a database accessible to the network node.

An advantage with embodiments herein is to enhance user experience by linking or tagging the media content with meta data that are automatically collected or recorded by the UE when the user is consuming the media content.

Another advantage with embodiments herein is to automatically retrieve the recorded meta data the next time the user consumes the same media content.

Yet another advantage is to share the recorded meta data and associated media content with other users.

Additional advantages are achieved by the present embodiments which will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
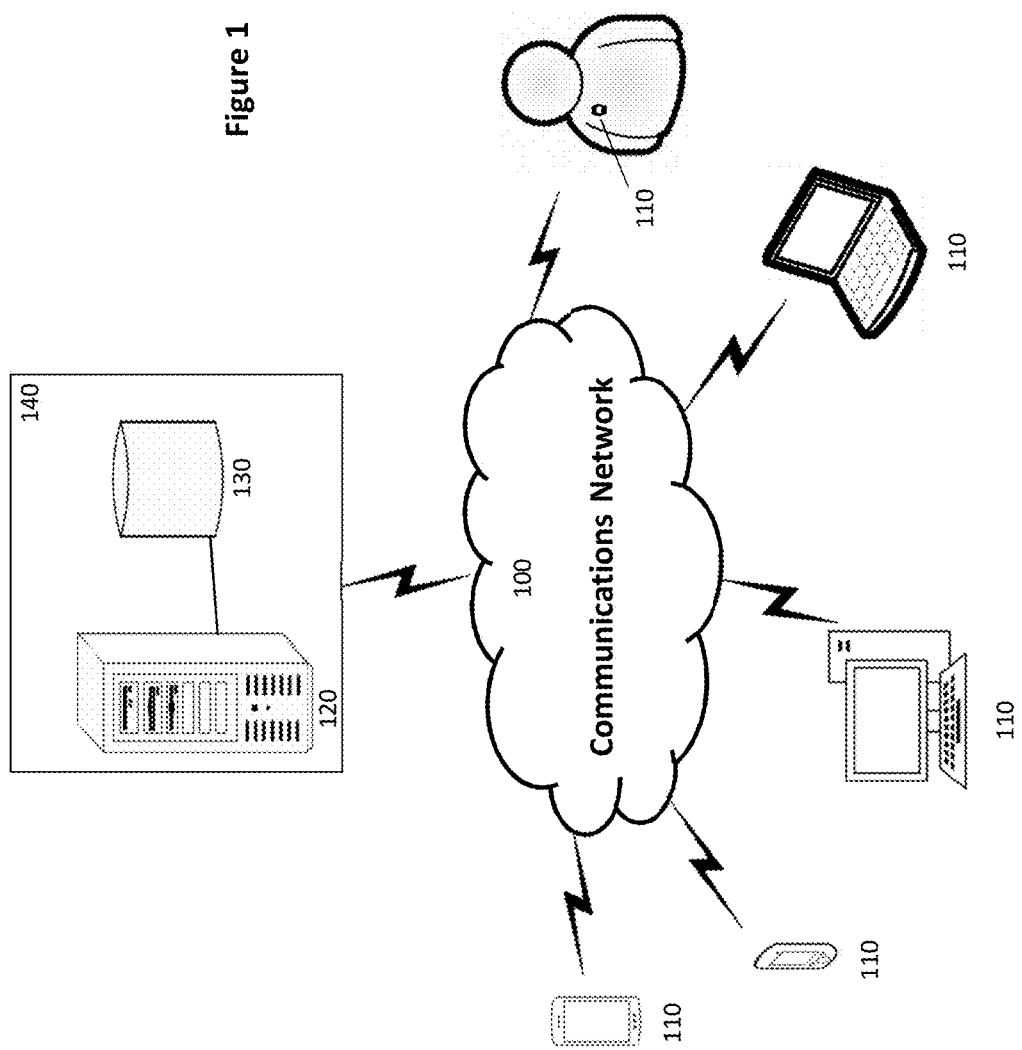
FIG. 1 is an example of a network scenario wherein embodiments herein may be employed.

FIG. 1 illustrates a network scenario wherein embodiments herein may be employed. As shown, the network scenario comprises communication devices 110 which may include a smartphone, a portable media player, a smart watch, a PC, a laptop computer, a wireless capable device that can be attached to a piece of clothing of the user, a music player, etc., and which can communicate with a network node 140 through a communications network 100. Hereinafter, a communication device 110 is referred to as a User Equipment (UE). The network node 140 may include a server 120 and a database 130. The communications network 100 may be a Local Area Network (LAN), a Wireless LAN, a Wide Area Network (WAN), Internet, a satellite communication network, etc.

In the context of the embodiments herein, the network node 140 or the server 120 may belong to an acoustic fingerprinting service provider. The database 130 is a fingerprinting media content database. By media content is meant music, song or tune which may be accessible via the Internet.

An acoustic or audio fingerprinting is the generation of an acoustic fingerprint of a media content (e.g., a song) fragment. An acoustic fingerprint is condensed a digital summary, generated from an audio signal, which can be used to identify an audio sample or quickly locate similar items in an audio database. An acoustic fingerprint algorithm takes into account the perceptual characteristics of the audio. If two files sound alike to the human ear, their acoustic fingerprints should match, even if their binary representations are quite different. Acoustic fingerprints are not bitwise fingerprints, which must be sensitive to any small changes in the data. Acoustic fingerprints are more analogous to human fingerprints where small variations that are insignificant to the features the fingerprint uses are tolerated. One can imagine the case of a smeared human fingerprint impression which can accurately be matched to another fingerprint sample in a reference database: acoustic fingerprints work in a similar way. A music database accessible to the network includes a plurality of songs wherein each song may be represented by a database entry. When the fingerprint server receives a song fragment, the server retrieves the song information which may include, the song title, the artist, the length of the song and related commercial information.

Figure 2:
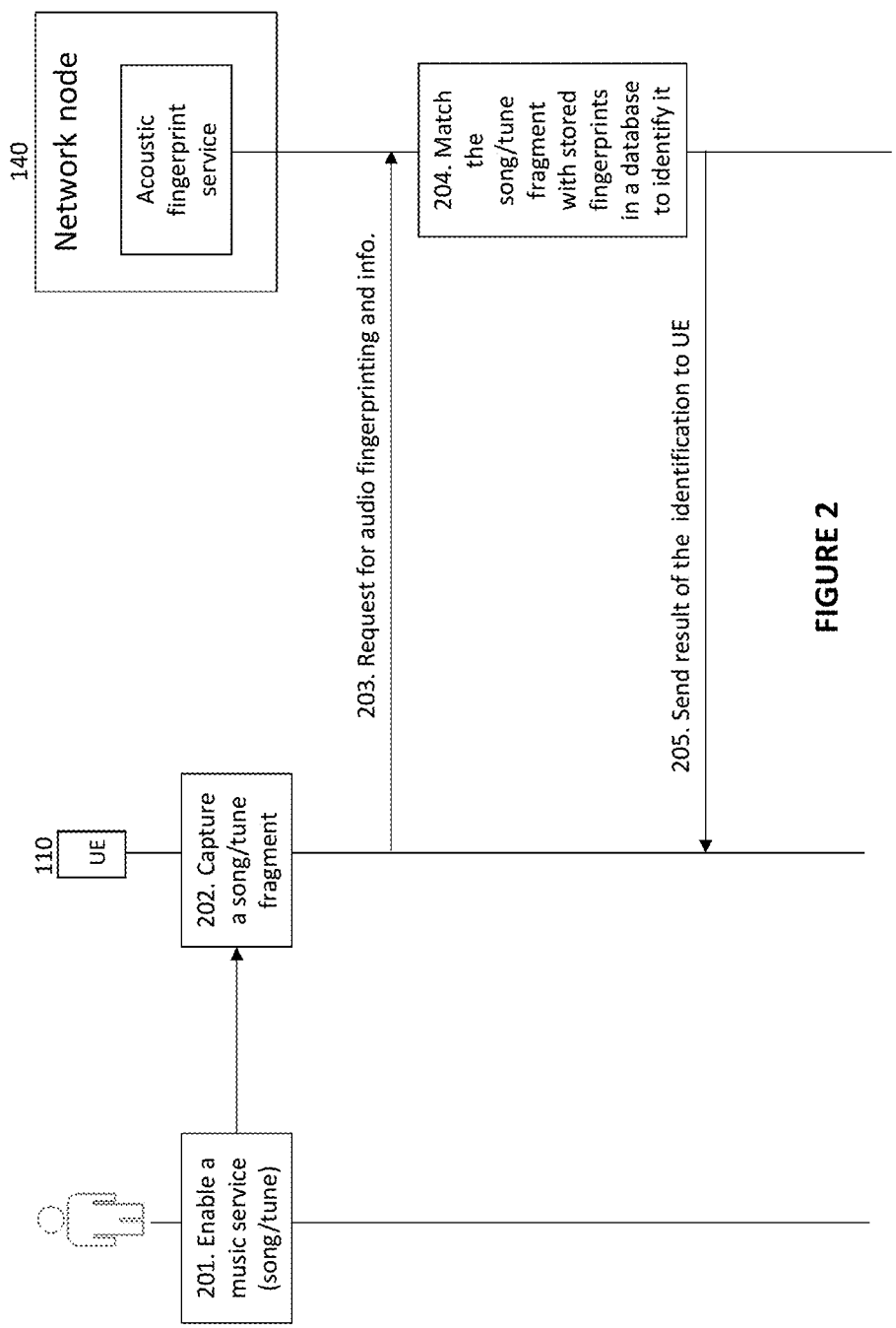
FIG. 2 is an exemplary diagram showing a basic identification of a media content.

It should be noted that the present invention is not restricted to any specific acoustic fingerprint technique. In the context of the present invention, a UE captures a fragment of the media content or song that a user is listening to and sends a request to a network node (e.g., network node 140) which processes the fragment for performing audio fingerprinting to identify the media content (e.g., the song) and related information that corresponds to the captured fragment. The result of the identification, which also includes information (artist, title song, length of the song, etc.), is returned to the requesting UE. FIG. 2 illustrates such a scenario where the media content is a music song/tune.

As shown in FIG. 2, in step 201, the user enables or activates a music service (e.g., a radio station or a media player). Assume that the user is listening to a song or a tune. The UE 110, being in the vicinity of the user, is configured to capture a segment of the song (step 202). The UE 110 is equipped with a microphone connected to a processor for listening or capturing the song fragment. In step 203, a request for acoustic/audio fingerprinting is sent from UE 110 to a network node 140 for analysis and for identifying the song. In step 204, the network node 140, which comprises an acoustic fingerprint service or function, performs the analysis to match the song/tune with fingerprints previously stored in a database (not shown). The database may be an external database 130 as shown in FIG. 1, or it may be integrated in the server 120 of the network node 140. In step 205, the result of the identification is transmitted to the UE 110. As previously described, the result of the identification may include information such as the band or artist's name, the title of the song, the length of the song, the album name that the song originated from, the type of music (genre), album track number, year the song was released, etc. The result may then be displayed on a User Interface (UI) of UE 110 if the UE 110 is provided with a display. Alternatively, the result may be presented to the user in any other form, e.g., through voice.

Figure 3A:
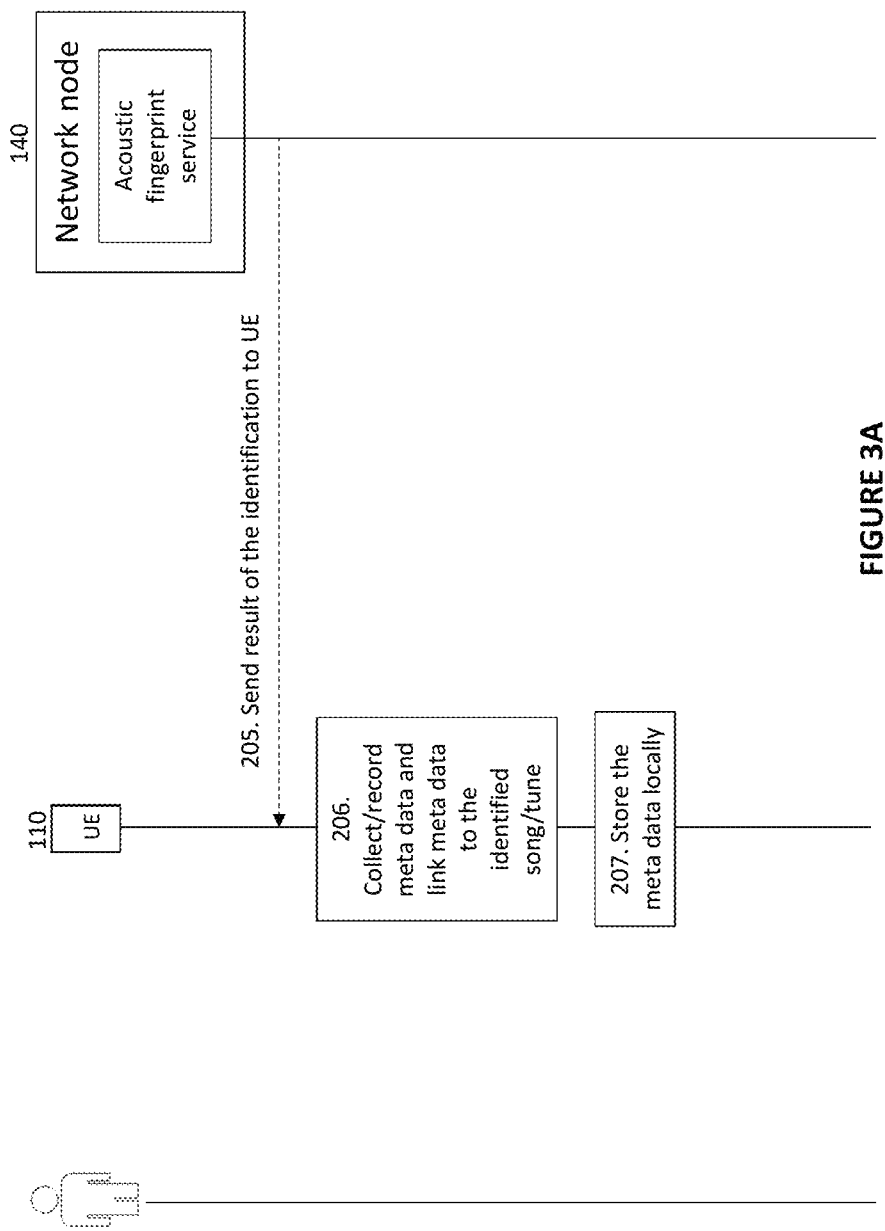
FIG. 3A is an exemplary diagram involving media content tagging according to an exemplary embodiment.

FIG. 3A depicts steps performed after the UE 110 received (step 205) the result of the identification previously described in conjunction with FIG. 1. In step 206, the UE 110 is configured to collect or record meta data that can be linked to the song or tune while the user is listening to the song or tune. The following meta data include at least one of the following: the date and time of the identified song/tune; the (geo)location of the user of the UE 110, i.e., the position of the user while listening to the song, biological data of the user (e.g., pulse) and a picture or a video taken by the user while listening to the song. The geographical location or position of the user of UE 110 may be performed by means of a GPS receiver and a GPS function of UE 110. The UE 110 is also provided with sensor(s) for collecting or sensing biological data of the user (e.g., pulse).

The result of the identification received in step 205 and the collected/recorded meta data are stored locally in the UE 110 in a memory, preferably in a secure manner, (step 207). As an example, the stored information is accessible for the user with valid credentials such as a user name and a password. The identified song is cross linked to the corresponding media and tagged to the media together with the meta data. This enables the user to search for the song in a later phase. For each identified song, a history (timeline) can be created and the meta data is connected to it.

Figure 3B:
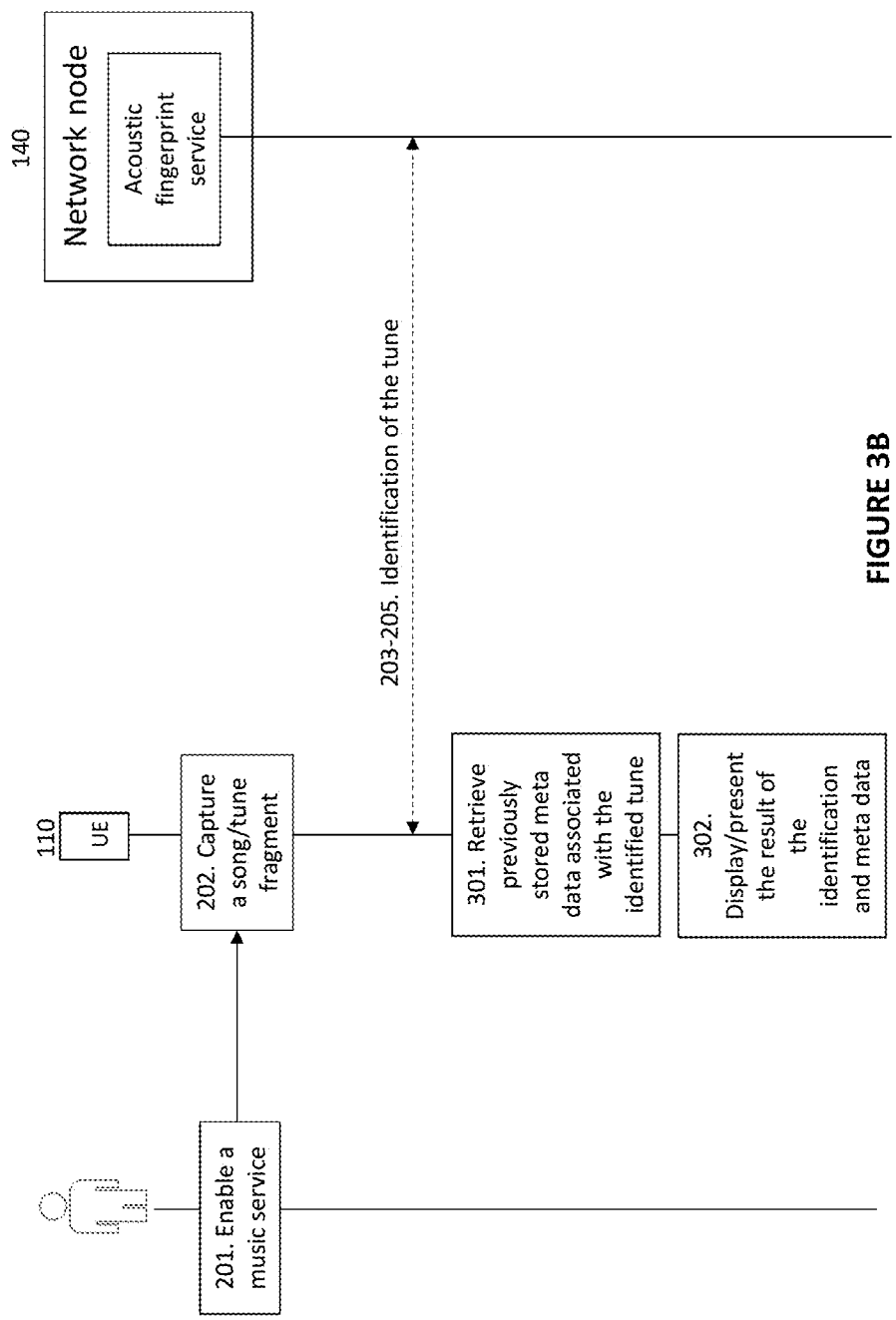
FIG. 3B is an exemplary diagram involving retrieval of meta data associated with the media content, from the UE, according to another exemplary embodiment.

FIG. 3B illustrates a scenario where the user at a later time listens to the same song/tune. Steps 201-205 are similar to those previously described is conjunction with FIG. 2 and FIG. 3A. As shown in FIG. 3B, the UE 110 is configured to retrieve (step 301) previously stored meta data associated with the identified tune. The result of the identification and the stored meta data are displayed/presented (step 302) to the user of UE 110. This way, the user remembers the circumstances, what happened the last time he/she heard the song and where. This enriches the user's experience. Each song/tune identified and tagged according to the embodiments herein may be used to create a playlist which is searchable. As an example, the user may select a song from the list and all associated information is displayed. As another example, a user may instead select to view a previously collected meta data (e.g., an image or a photo or a video) that is linked to a song/tune that was previously recorded/heard when the image was taken. The information associated with the song/tune and other collected meta data may be displayed/presented to the user by means of UE 110.

Figure 4A:
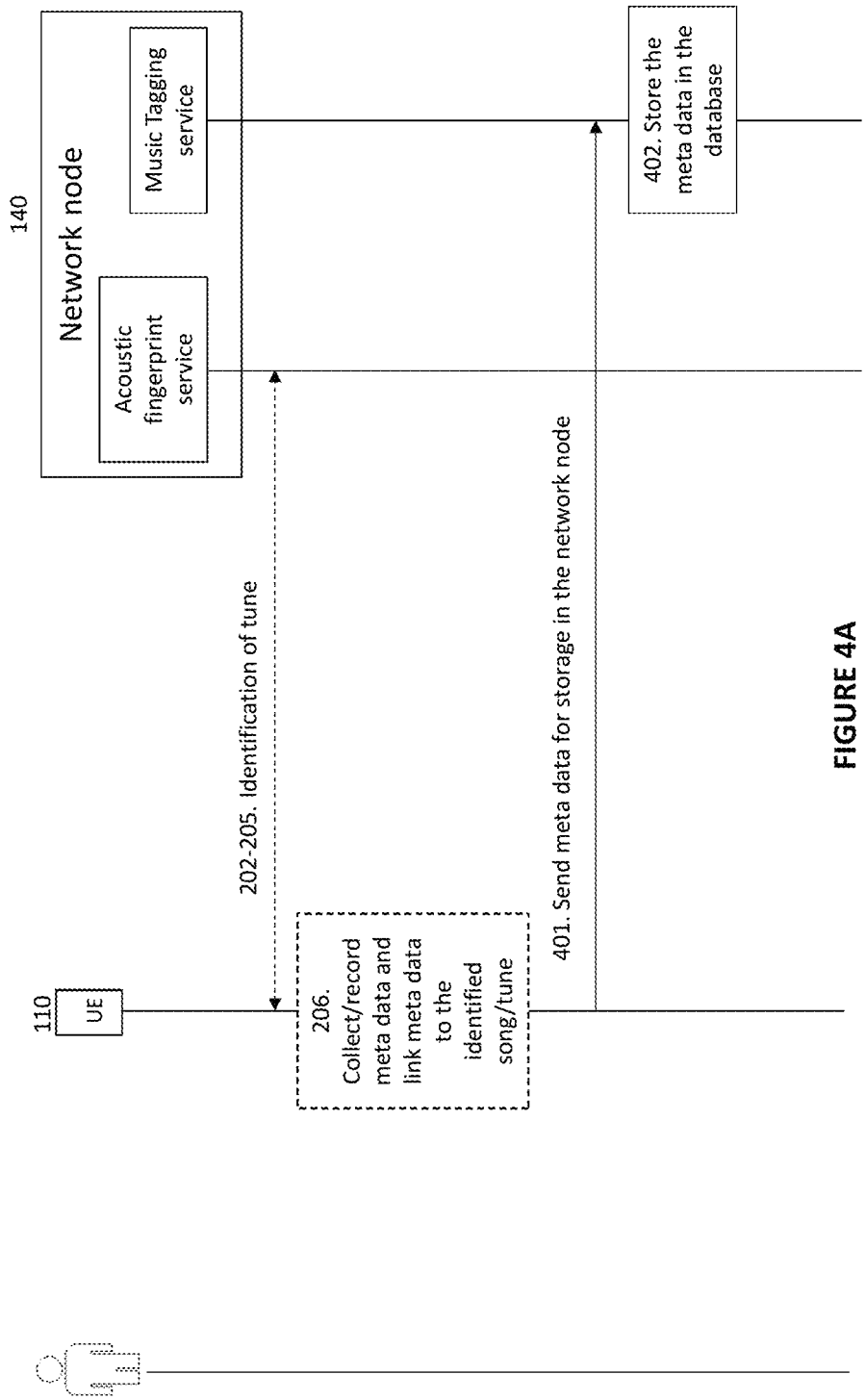
FIG. 4A is an exemplary diagram involving media content tagging according to another exemplary embodiment.

FIG. 4A illustrates another scenario according to another exemplary embodiment. Steps 202-206 are similar to those in FIGS. 2 and 3A. But instead of storing locally the collected meta data, the UE 110 is configured to send (step 401) the collected meta data for storage in the database of the network node 140. The network node 140 may be provided with a music tagging service function that receives the data and store it in the database (step 402). The music tagging service stores the data per identified song/tune and link the data to the user's account. The result of the identification (step 205) may also be stored in the database. The stored data is accessible for the user using credentials.

Figure 4B:
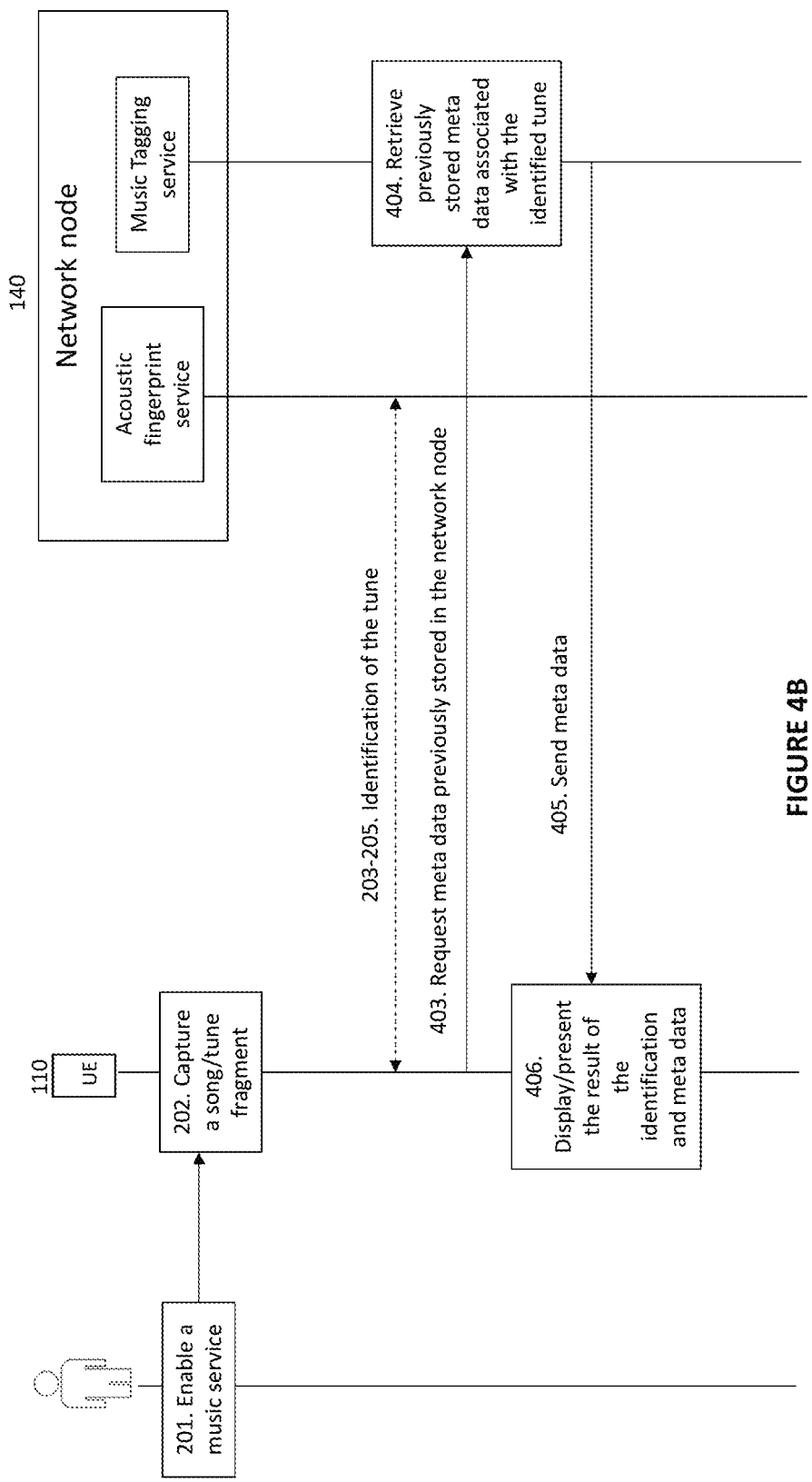
FIG. 4B is an exemplary diagram involving retrieval of meta data associated with the media content, from the network, according to another exemplary embodiment.

FIG. 4B depicts the scenario in which the data stored in the network node, or in the database accessible to the network node, is retrieved the next time the user is consuming the same media content. Steps 201-205 are similar to those previously described is conjunction with FIG. 2 and FIG. 3A. In step 403, the UE 110 sends a request to the network node 140 for retrieving previously stored meta data associated with the identified tune. The music tagging service function of the network node 140 retrieves the stored meta data from the database (step 404) and sends the data to the UE 110 (step 405). The result of the identification and the meta data are displayed/presented to the user by means of UE 110.

Figure 4C:
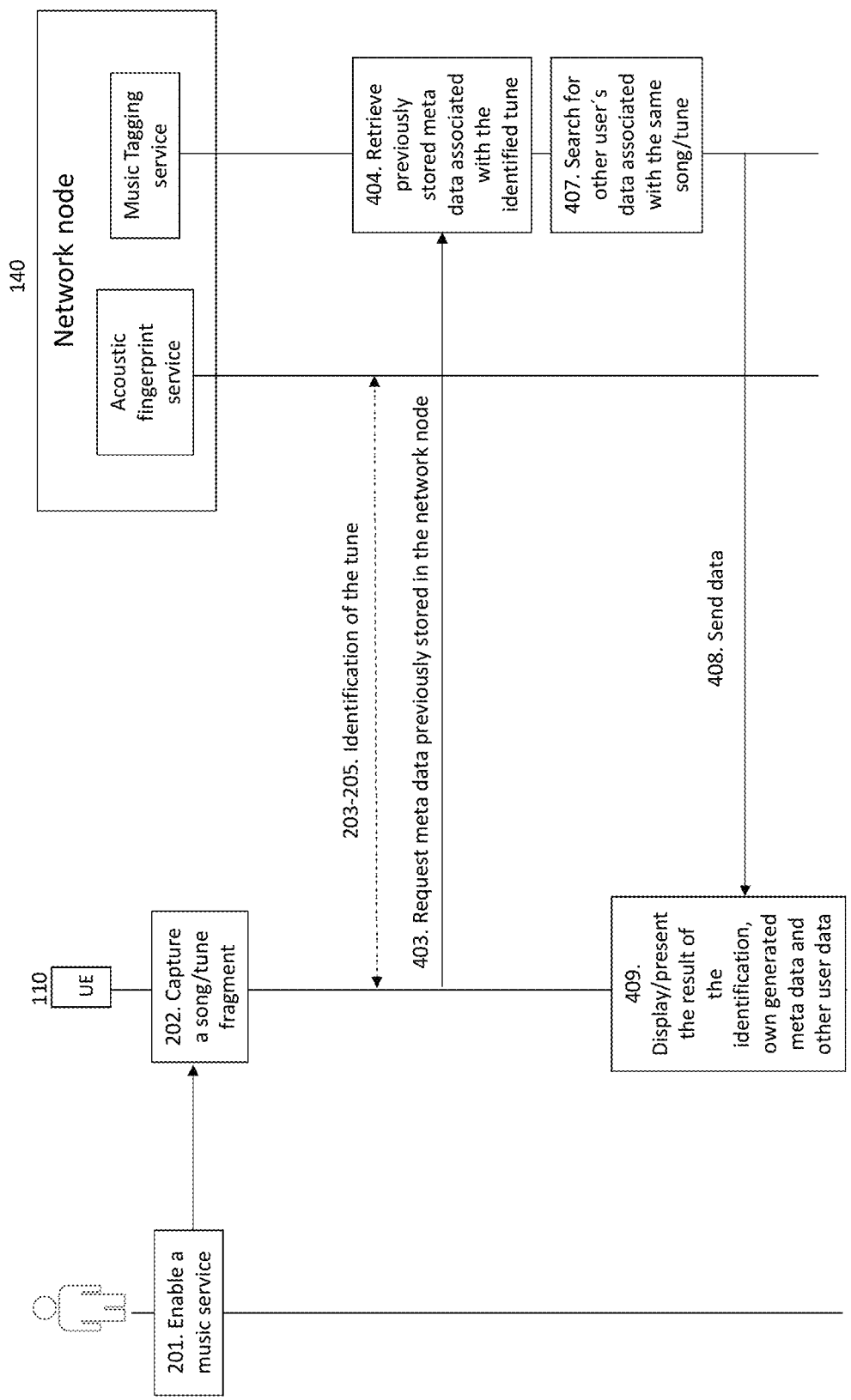
FIG. 4C is an exemplary diagram involving retrieval of meta data associated with the media content, from the network, according to yet another exemplary embodiment.

FIG. 4C illustrates another scenario in which the music tagging service function of the network node 140 permits the sharing of meta data related to a tune between users. Steps 201-205, and 403 are similar to those previously described is conjunction with FIG. 2, FIG. 3A and FIG. 4B. The Music tagging service function is configured to retrieve (step 404) the meta data previously stored in the network node 140 and is further configured to search (step 407) for other user's meta data that are associated with the same tune. This requires that the other user permits the retrieval of such meta data upon a request from a user. It should be mentioned that the network node 140 may be provided by a music tagging service function for each user. The network node 140, by means of the music tagging service function, retrieves the requested data (from the database) and sends (step 408) the data to the requesting UE 110. The result of the identification, the own meta data and the meta data of the other user may then be displayed/presented (step 409) to the user by means of UE 110.

Figure 5:
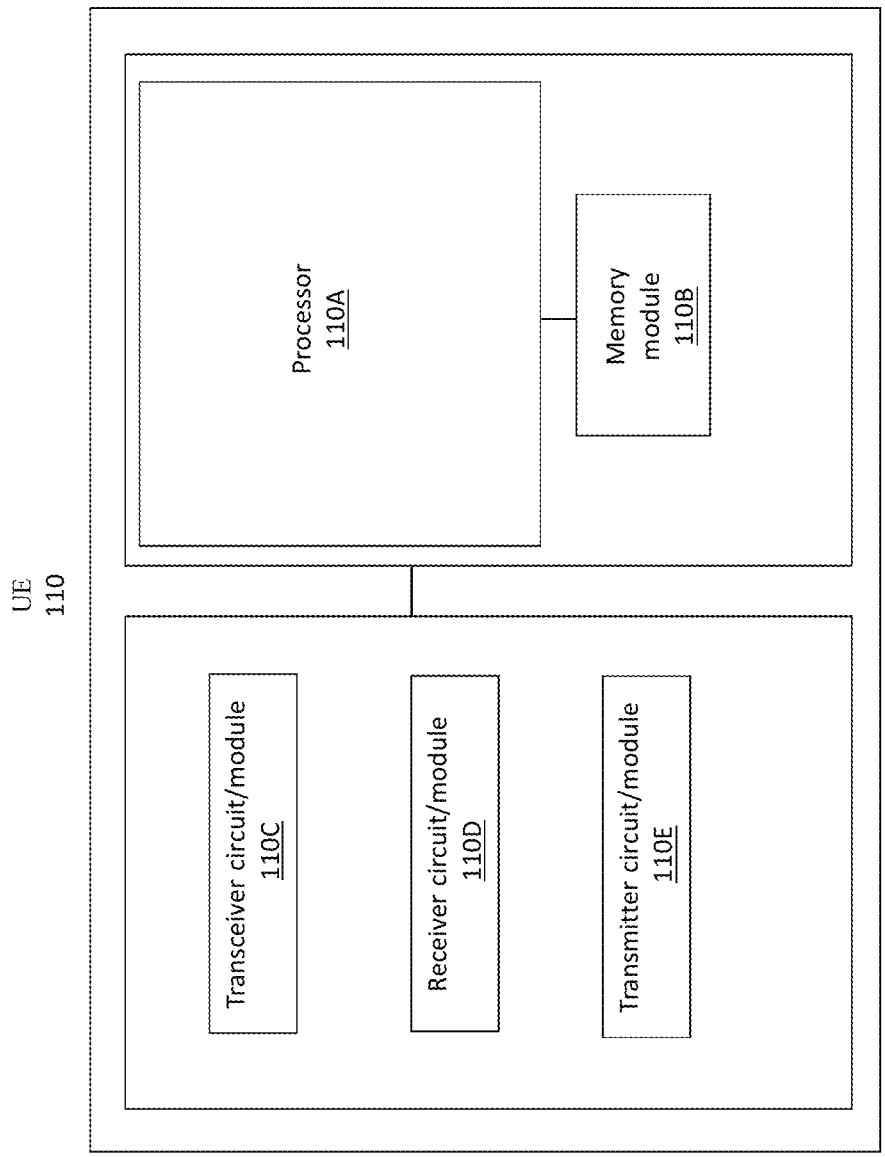
FIG. 5 illustrates an exemplary block diagram of a UE according to embodiments herein.

Referring to FIG. 5, there is illustrated an exemplary block diagram of a UE 110 for determining meta data information associated with a media content according to exemplary embodiments herein. UE 110 comprises a processing circuit or a processing module or a processor 110A; a memory module 110B; a receiver circuit or receiver module 110D; a transmitter circuit or transmitter module 110E; and a transceiver circuit or transceiver module 110C which may include the transmitter circuit 110E and the receiver circuit 110D. The UE 110, for example, a mobile phone, a cell phone, a smart phone, a tablet, a PDA, a music player, a laptop etc. may support any of radio access technologies including 2G, 3G, 4G, 5G, Wifi, Wimax or a combination thereof. The UE 110 may include a camera, a GPS receiver, an audio codec coupled to a speaker, a microphone, and an earphone jack. The UE 110 may also include a display controller (e.g., a touchscreen controller) which provides a graphical output to a display and in input from a touch input device. Collectively, the display device and touch input device may be referred to as touchscreen. The UE 110 is capable of communicating wirelessly to the Internet via WiFi or any wireless access technology mentioned above. The UE 110 may include additional component, entities, means or devices not shown in FIG. 5.

The processing module/circuit 110A includes a processor, microprocessor, an application specific integrated circuit (ASIC), field programmable gate array (FPGA), or the like, and may be referred to as the "processor 110A." The processor 110A controls the operation of the UE 110 and its components. Memory (circuit or module) 110B includes a random access memory (RAM), a read only memory (ROM), and/or another type of memory to store data and instructions that may be used by processor 110A.

The processor 110A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 110A to carry out the operations of the UE 110 disclosed herein.

The UE 110 is operative to capture a fragment of the media content (song/tune). The UE 110 is further operative to send a request to a network node for performing an acoustic/audio fingerprinting on said captured fragment to identify the media content that corresponds to the captured fragment. The UE 110 is further operative to receive a result of the identification from the network node. The UE 110 is further operative to collect or record meta data for linking to the identified media content, which meta data includes at least one of the following data collected or recorded during the time said media content is being consumed by the user of the UE: time/date of the identified media content; photos (s) and/or video(s); a location of the user of the UE, biological data of the user; and to store at least the collected or recorded meta data and the result of the identification locally in the UE 110 or in a database accessible to the network node.

The UE 110 is operative to retrieve the collected or recorded meta data and the result of the identification and display/present those to the user the next time the user of the UE consumes the same media content.

Additional functions performed by the UE have already been disclosed and need not repeated again.

There is also provided a computer program comprising instructions which when executed on at least one processor 110A of the UE 110 according to embodiments herein, cause the at least one processor 110A to carry out the method previously described. Also a carrier containing the computer program is provided, wherein the carrier is one of a computer readable storage medium; an electronic signal, optical signal or a radio signal.

Figure 6:
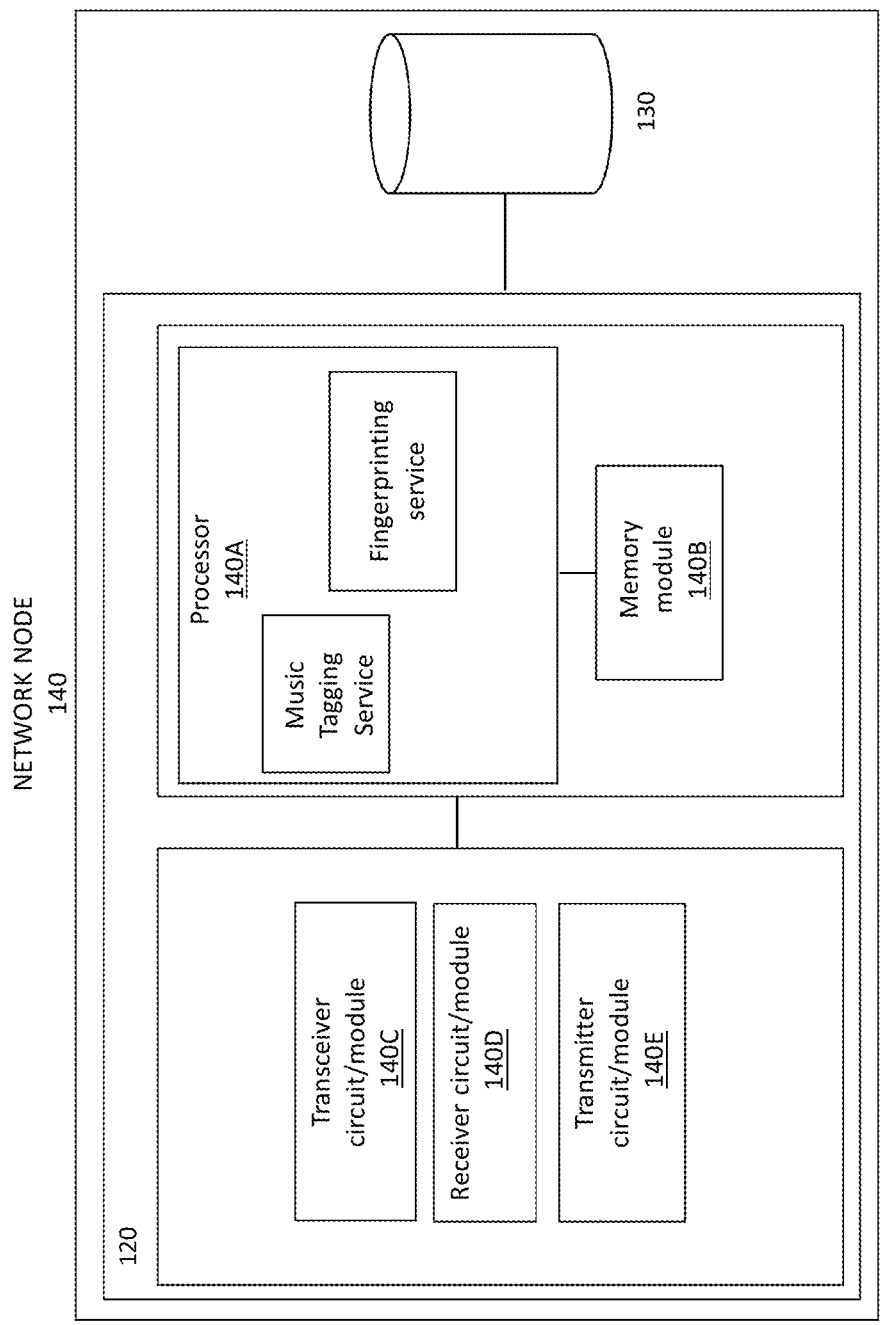
FIG. 6 illustrates an exemplary block diagram of a network node according to embodiments herein.

Referring to FIG. 6, there is illustrated an exemplary block diagram of a network 140 for storing meta data information associated with a media content according to exemplary embodiments herein. As shown, the network node 140 may be a server 120 and a database 130. The network node 140 further comprises a processing circuit or a processing module or a processor 140A; a memory module 140B; a receiver circuit or receiver module 140D; a transmitter circuit or transmitter module 140E; and a transceiver circuit or transceiver module 140C which may include the transmitter circuit 140E and the receiver circuit 140D. The network node 140 may support any of radio access technologies including 2G, 3G, 4G, 5G, WiFi, Wimax or a combination thereof for communication with the UE 110. The network node 140 is also shown provided with a fingerprinting service function and a music tagging service function as previously described.

The processing module/circuit 140A includes a processor, microprocessor, an application specific integrated circuit (ASIC), field programmable gate array (FPGA), or the like, and may be referred to as the "processor 110A." The processor 110A controls the operation of the network node 140 and its components. Memory (circuit or module) 140B includes a random access memory (RAM), a read only memory (ROM), and/or another type of memory to store data and instructions that may be used by processor 140A.

The processor 140A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 140A to carry out the operations of the network node 140 disclosed herein.

The network node 140 is operative to receive a request, from a UE, to perform an acoustic/audio fingerprinting (by means of the fingerprinting service function) on a fragment of the media content, captured by the UE, to identify the media content that corresponds to the captured fragment. The network node 140 is further operative to transmit a result of the identification to the UE and to receive from the UE meta data collected or recorded by the UE, which meta data includes at least one of the following data collected or recorded during the time said media content is being consumed by the user of the UE: time/date of the identified media content; photos(s) and/or video(s); a location of the user of the UE; biological data of the user. The network node 140 is further operative to store at least the collected or recorded meta data and the result of the identification locally in a database 130 accessible to the network node 140.

Additional functions performed by the network node 140 including the functions performed by the music tagging service function have already been described and need not be repeated again.

There is also provided a computer program comprising instructions which when executed on at least one processor 140A of the network node 140 according to embodiments herein, cause the at least one processor 140A to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation.

The invention claimed is:

1. A method performed in a user equipment (UE) for determining meta data information associated with media content, the media content including audio content, the method comprising:
    capturing, by a processor, a fragment of the media content;
    sending a request to a network node for performing an acoustic/audio fingerprinting on the fragment to identify the media content that corresponds to the captured fragment, wherein the acoustic/audio fingerprinting is a condensed digital summary and generated from an audio signal;
    receiving, by the processor, a result of an identification of the media content from the network node;
    collecting or recording, by the processor, meta data for linking to the identified media content, the meta data including at least one of following data collected or recorded during time the media content is being consumed by a user of the UE, at least one of time and date of the identified media content, at least one of a photo and a video, a location of the user of the UE, and biological data of the user;
    storing, by the processor, at least the collected or recorded meta data and the result of the identification of the media content locally in the UE or in a database accessible to the network node;
    a next time the user of the UE consumes the same media content, automatically retrieving the collected or recorded meta data and the result of the identification of the media content and at least one of displaying and presenting the retrieved meta data and the result of the identification of the media content on the UE; and
    permitting, by the processor, sharing of the recorded meta data between users by allowing the UE to present to the user the recorded meta data and meta data of another user.

2. The method according to claim 1, further comprising retrieving the meta data from the UE or sending a request to the network node.

3. The method of claim 1, further comprising presenting to the user the meta data and meta data of another user thereby allowing sharing of meta data between users.

4. A method performed in a network node for storing meta data information associated with media content, the media content including audio content, the method comprising:
    receiving a request, from a user equipment (UE), for performing an acoustic/audio fingerprinting on a fragment of the media content captured by the UE to identify the media content that corresponds to the fragment, wherein the acoustic/audio fingerprinting is a condensed digital summary and generated from an audio signal;
    transmitting, by a processor, a result of an identification of the media content to the UE;
    receiving, from the UE, meta data collected or recorded by the UE, the meta data including at least one of following data collected or recorded during time the media content is being consumed by the user of the UE; at least one of time and date of the identified media content, at least one of a photos and a video, a location of the user of the UE, and biological data of the user;

storing at least the collected or recorded meta data and the result of the identification in a database accessible to the network node;

a next time the user of the UE consumes the same media content, receiving a request from the UE to automatically retrieve the meta data and the result of the identification of the media content;

transmitting the retrieved meta data and the result of the identification of the media content to the UE; and permitting, by the processor, sharing of the recorded meta data between users by allowing the UE to present to the user the recorded meta data and meta data of another user.

5. The method of claim 4, further comprising permitting the sharing of meta data between users by allowing the UE to present to the user the meta data and meta data of another user.

6. A user equipment (UE) for determining meta data information associated with a media content, the media content including audio content, the UE comprising a processor and a memory containing instructions executable by the processor, wherein the UE is operative to:

capture, by the processor, a fragment of the media content;

send a request to a network node for performing an acoustic/audio fingerprinting on said fragment to identify the media content that corresponds to the captured fragment, wherein the acoustic/audio fingerprinting is a condensed digital summary and generated from an audio signal;

receive, by the processor, a result of an identification of the media content from the network node;

collect or record meta data for linking to the identified media content, the meta data including at least one of following data collected or recorded during time the media content is being consumed by a user of the UE, at least one of time and date of the identified media content, at least one of a photos and a video, a location of the user of the UE, and biological data of the user;

store, by the processor, at least the collected or recorded meta data and the result of the identification of the media content locally in the UE or in a database accessible to the network node;

a next time the user of the UE consumes the same media content, automatically retrieve the collected or recorded meta data and the result of the identification of the media content and at least one of display and present the retrieved meta data and the result of the identification of the media content on the UE; and permitting, by the processor, sharing of the recorded meta data between users allowing the UE to present to the user the recorded meta data and meta data of another user.

7. The UE according to claim 6, wherein the UE is operative to retrieve the meta data from the UE or send a request to the network node.

8. The UE of claim 6, wherein the UE is further operable to present to the user the meta data and meta data of another user thereby allowing sharing of meta data between users.

9. A network node for storing meta data information associated with a media content, the media content including audio content, the network node comprising a processor and a memory containing instructions executable by the processor, wherein the network node is operative to:

receive a request, from a user equipment (UE), for performing an acoustic/audio fingerprinting on a fragment of the media content captured by the UE to identify the media content that corresponds to the captured fragment, wherein the acoustic/audio fingerprinting is a condensed digital summary and generated from an audio signal;

transmit a result of an identification of the media content to the UE;

receive, from the UE, meta data collected or recorded by the UE, the meta data including at least one of following data collected or recorded during time the media content is being consumed by the user of the UE, at least one of time and date of the identified media content, at least one of a photos and a video a location of the user of the UE, and biological data of the user;

store at least the collected or recorded meta data and the result of the identification in a database accessible to the network node;

a next time the user of the UE consumes the same media content, receive a request from the UE to automatically retrieve the meta data and the result of the identification of the media content;

transmit the retrieved meta data and the result of the identification of the media content to the UE; and permitting, by the processor, sharing of the recorded meta data between users by allowing the UE to present to the user the recorded meta data and meta data of another user.

10. The network node of claim 9, wherein the network node is further operable to permit the sharing of meta data between users by allowing the UE to present to the user the meta data and meta data of another user.

* * * * *